US008568832B2

(12) United States Patent
Nanna et al.

(10) Patent No.: US 8,568,832 B2
(45) Date of Patent: *Oct. 29, 2013

(54) METHOD OF APPLYING A MAGNESIUM-CONTAINING POWDER TO THE SURFACE OF AN ALUMINUM OR ALUMINUM ALLOY SUBSTRATE

(75) Inventors: Michael E. Nanna, Moorhead, MN (US); Gordon P. Bierwagen, Fargo, ND (US); Dante Battocchi, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 1057 days.

This patent is subject to a terminal disclaimer.

(21) Appl. No.: 10/579,148

(22) PCT Filed: Oct. 7, 2004

(86) PCT No.: PCT/US2004/033089
§ 371 (c)(1),
(2), (4) Date: Feb. 9, 2007

(87) PCT Pub. No.: WO2005/051551
PCT Pub. Date: Jun. 9, 2005

(65) Prior Publication Data
US 2007/0128351 A1      Jun. 7, 2007

Related U.S. Application Data

(60) Provisional application No. 60/519,681, filed on Nov. 13, 2003, provisional application No. 60/562,883, filed on Apr. 16, 2004.

(51) Int. Cl.
*B05D 5/00*   (2006.01)
*B05D 7/14*   (2006.01)

(52) U.S. Cl.
CPC ... *B05D 5/00* (2013.01); *B05D 7/14* (2013.01)
USPC ......... 427/405; 427/328; 427/410; 427/419.7

(58) Field of Classification Search
CPC .................................. B05D 5/00; B05D 7/14
USPC ......... 427/180, 299, 301, 302, 304, 327, 328, 427/402, 404, 405, 410, 419.7; 106/1.05, 106/1.11, 14.05, 14.15, 14.16, 14.21, 14.41, 106/14.42, 14.44, 286.6; 524/439, 590; 525/528; 528/76
See application file for complete search history.

(56) References Cited

U.S. PATENT DOCUMENTS

| | | | | |
|---|---|---|---|---|
| 2,933,400 | A | * | 4/1960 | Wurbs et al. ............... 106/14.25 |
| 4,083,726 | A | * | 4/1978 | Parson et al. ............... 106/14.41 |
| 4,219,358 | A | | 8/1980 | Hayashi et al. |
| 4,360,384 | A | * | 11/1982 | McKaveney et al. ........ 106/1.12 |
| 6,069,197 | A | | 5/2000 | Daech et al. |
| 6,270,884 | B1 | | 8/2001 | Guhde et al. |
| 6,632,294 | B2 | * | 10/2003 | Mansfeld et al. ............. 148/272 |
| 2005/0161641 | A1 | * | 7/2005 | Gros ............................. 252/500 |
| 2009/0155598 | A1 | | 6/2009 | Bierwagen et al. |

FOREIGN PATENT DOCUMENTS

| | | |
|---|---|---|
| JP | 53-045361 A | 4/1978 |
| JP | 56-102584 A | 8/1981 |
| WO | WO 03/089529 A1 * | 10/2003 |
| WO | 2007/117270 A2 | 10/2007 |
| WO | 2008/089529 A1 | 7/2008 |

OTHER PUBLICATIONS

Walker, "Organo Silanes as Adhesion Promoters for Organic Coatings," Journal of Coatings Technology, vol. 52, No. 670, pp. 49-61, Nov. 1980.*
Klein. "Inorganic Zinc-rich," Generic Coating Types: An Introduction to Industrial Maintenance Coating Materials, L. Smith, ed., Pittsburgh, Penn: Technology Publication Company (1996).
Walker, "Organo Silanes as Adhesion Promoters for Organic Coatings," Journal of Coatings Technology, vol. 52, No. 670; pp. 49-61, Nov. 1980.
Van Vliet, "Reduction of zinc and volatile organic solvents in two-pack anti-corrosive primers, a pilot study", Progress in Organic Coatings, 34:220-226 (1998).
Keijman, "High Solids Coatings: Experience in Europe and USA"—Paper 40, Proceedings PCE Conference, The Hague, The Netherlands "Protecting industrial and marine structures with coatings," Mar. 1997.
Bierwagen et al., "Recent Studies of Particle Packing in Organic Coatings," Progress in Organic Coatings, 35:1-9 (1999).
Hale, et al., "Glass Transition Temperature as a Function of Conversion in Thermosetting Polymers", Macromolecules, vol. 24, No. 9, pp. 2610-2621 (1991).
Canadian Intellectual Property Office, Office Action for Application No. 2,545,091 dated Mar. 8, 2011.
Kline, "Inorganic Zinc-rich," Generic Coating Types: An Introduction to Industrial Maintenance Coating Materials, L. Smith, ed., Pittsburgh, Penn: Technology Publication Company (1996), pp. 164-197.
Mar. 2, 2012, Office Action in U.S. Appl. No. 11/992,112.
Sep. 10, 2012, Office Action in U.S. Appl. No. 11/992,112.

* cited by examiner

*Primary Examiner* — William Phillip Fletcher, III
(74) *Attorney, Agent, or Firm* — J.A. Lindeman & Co., PLLC (57) ABSTRACT

Disclosed are methods of treating a metal to improve the metal's corrosion resistance. The method includes applying, to the surface of the metal, a coating which comprises magnesium powder and a binder. The present invention also relates to a coating composition that includes magnesium powder and a silane modified epoxy isocyanate hybrid polymer or prepolymer. The inventors have found that corrosion resistance (as determined by Prohesion™ exposure in accordance with ASTM D5894-96, which is hereby incorporated by reference) in excess of 3,000 hours on 2024 T-3 aluminum alloy can be achieved with the methods and coating compositions of the present invention.

30 Claims, 4 Drawing Sheets

METHOD OF APPLYING A MAGNESIUM-CONTAINING POWDER TO THE SURFACE OF AN ALUMINUM OR ALUMINUM ALLOY SUBSTRATE

The present application claims the benefit of U.S. Provisional Patent Application Ser. No. 60/519,681, filed Nov. 13, 2003, and U.S. Provisional Patent Application Ser. No. 60/562,883, filed Apr. 16, 2004, each of which provisional patent applications is hereby incorporated by reference.

The present invention was made with the support of the U.S. Air Force Office of Scientific Research Grant No. F49620-99-1-0283. The Federal Government may have certain rights in this invention.

FIELD OF THE INVENTION

The present invention is directed, generally, to a composition and method for its use in preventing or inhibiting corrosion of metals, particularly aluminum and aluminum alloys.

BACKGROUND OF THE INVENTION

Many metals are susceptible to corrosion. In this regard, atmospheric corrosion is of particular concern. Such corrosion may affect the performance and/or appearance of the metals affected, and the products produced therefrom. In addition, when polymer coatings such as paints, adhesives or sealants are applied to the metal, corrosion of the underlying metal may cause a loss of adhesion between the polymer coating and the base metal. A loss of adhesion between the polymer coating and the base metal may similarly lead to corrosion of the metal. Aluminum and aluminum alloys frequently require corrosion protection and improvements in adhesion between the base aluminum (or aluminum alloys) and subsequent polymer coatings. Aluminum alloys, in particular, can be susceptible to corrosion since the alloying elements used to improve the metal's mechanical properties may decrease corrosion resistance.

Traditionally, precipitation grade hardened high strength Al alloys, containing heterogeneous microstructures formed from intermetallic compounds of Cu, Mg, Fe and Mn, are used with protective coating systems containing CrIV, chromates, and dichromates that are especially effective at inhibiting Al alloy corrosion. These corrosion resistant aircraft coating systems for aluminum substrates typically consist of a conversion coating layer, a primer layer, and a topcoat. In practice, chromate conversion coatings ("CCC") can either be deposited on the Al surface anodically by an applied anodic current, or developed chemically by the reaction of a tri-and hexa-valent chromium salt solution (i.e., Alodine™) with the Al metal. In spite of the widespread success and use of CCC systems in protecting Al aircraft structures, as well as Cr-pigmentation, the use of chromates is being curtailed as they have been found to be carcinogenic, to be expensive to handle, and to the source of one of the highest airplane maintenance costs.

Generally, corrosion processes describe the oxidation of a metal at its surface which acts to weaken and/or disfigure it. Most metals are active enough to be converted to their oxides, and it is generally accepted that corrosion occurs by an electrochemical action involving the creation of small galvanic cells on the surface of the metal. It has been observed that the bulk of structural corrosion damage to aging aircraft emanates from components involved in the joining process to the airframe itself, such as rivets, fasteners, lap splices, joints, and spot welding. All of these joining methods are associated with metallurgical and environmentally induced factors that affect the alloying elements in the metal, and, once changed, the exterior and interior surfaces of the aircraft become more susceptible to corrosion. For example, in the one fleet of aircraft, crevice corrosion occurring in the spot welded lap joint/doubler and environmentally induced corrosion around steel fasteners on the upper wing skins have been observed and addressed as major corrosion issues.

Categorically, there are three broad factors associated with corrosion processes in aluminum alloys: 1) metallurgical; 2) mechanical, and 3) environmental. Metallurgically induced factors include heat treatment, chemical composition of the alloying elements, material discontinuities, for example the presence of voids, precipitates, grain boundaries/orientation, and/or copper concentration in second-phase (S-phase). Mechanical factors include cycle-dependent fatigue and fatigue crack initiation. Further, environmental factors contributing to corrosion include temperature, moisture content, pH, electrolyte, type of salt present, and frequency and duration of exposure.

The most widely accepted factors contributing to corrosion processes in military aluminum aircraft structures, are direct chemical attack (e.g., aggressive phosphate ester hydraulic fluid leaks), galvanic corrosion (e.g., when metals of different electrochemical potential are in contact in a corrosive medium), crevice corrosion (e.g., when a corrosive liquid gains access to crevices in or between components), pitting corrosion (e.g., a localized attack that leads to the formation of deep and narrow cavities), and stress corrosion (e.g., when tensile stress or critical environment conditions cause dealloying to occur at grain boundaries which results in the formation of anodic precipitate areas). Overall, among all of these corrosion types, material thinning by pitting at particle sites is the most basic corrosion mechanism affecting Al 2024 T-3 fuselage skin material.

Generally, Al 2024 T-3 is used for the exterior fuselage, wing skins, and flight control surfaces, where pits are observed to form in exposed grain structure when subjected to environmental conditions that favor pitting. Pitting corrosion in Al 2024 T-3 occurs when cathodic particles (Al, Cu, Fe and Mn) dissolve in the alloy matrix while anodic particles (Al and Mg) also dissolve, leading to intergranular corrosion. It has been approximated that there are roughly three times more anodic particles than cathodic particles in Al 2024 T-3, and, therefore, it is prone to intergranular corrosion induced by pitting. The failure to address airframe corrosion damage due to shallow pitting, or damage related to fatigue and cracking can lead to catastrophic consequences, such as, incidents in the mid 1950s when two Comet airplanes failed in high altitude flight and the Aloha Airlines incident of 1988.

As mentioned above, prior art techniques for improving corrosion resistance of metals widely employ the use of chromate conversion coatings to passivate the surface. Such chromate treatments are undesirable, however, because the chromium used is highly toxic, carcinogenic, and environmentally undesirable. Phosphate conversion coatings are also used, but generally provide substantially less corrosion protection unless used in conjunction with a chromate.

Recently, various techniques for eliminating the use of chromates in corrosion inhibition and adhesion promotion treatments have been proposed. However, many of these proposed techniques have been proven to be ineffective, or to require time consuming, energy inefficient, multi-step processes. Thus, there remains a need for a simple, low cost, effective technique for inhibiting corrosion of metals, particularly for aluminum and aluminum alloys. The present invention, at least in part, is directed to meeting this need.

SUMMARY OF THE INVENTION

The present invention relates to a method of treating a metal to improve the metal's corrosion resistance. The method includes applying, to the surface of the metal, a coating which comprises magnesium powder and a binder.

The present invention also relates to a coating composition that includes magnesium powder and a silane modified epoxy isocyanate hybrid polymer or prepolymer.

BRIEF DESCRIPTION OF THE DRAWINGS

FIGS. 1A-1C are schematic diagrams showing the development of a multi-layer covalent structure used in accordance with certain embodiments of the present invention.

DETAILED DESCRIPTION OF THE INVENTION

The present invention relates to a method of treating a metal to improve the metal's corrosion resistance. The method includes applying, to the surface of the metal, a coating which comprises magnesium powder and a binder.

A variety of metals, such as aluminum and aluminum alloys, can be protected using the methods of the present invention. Illustratively, the methods of the present invention can be used to treat aluminum alloys which contain copper (which is meant to include heterogeneous microstructures formed from intermetallic compounds containing copper) and one or more other metals, such as Mg, Fe, and Mn. For example, the methods of the present invention can be used to treat copper-containing aluminum alloys which are commonly used in airplanes and other aircraft, such as Al 2024 T-3 and Al 7075 T-6. Other metals that can be protected using the methods of the present invention include iron and iron alloys (such as steel), copper and copper alloys (such as brass and bronze), tin and tin alloys, metals or metal alloys that are less reactive than magnesium, metals or metal alloys that are less reactive than aluminum, and/or metals or metal alloys that are less reactive than Al 2024 T-3 and/or Al 7075 T-6.

It will be appreciated that the metal being protected can be part of a structure that is made of a number of different metal components. Many such structures include components made of different metals (or alloys) in physical contact with one another. The point or points where different metals are in physically connected is a place where galvanic corrosion is enhanced by the contact of the metals. The high activity of magnesium used in the methods of the present invention, when compared to the activities of most other metals, permits the method of the present invention to be used on substrates made of two or more components of different metals in contact with one another (e.g., an aluminum component in contact with a steel component) without the risk of improving the corrosion resistance of one component while promoting corrosion of another component. As an illustration of such structures containing two or more metals in contact with one another, there can be mentioned a structure that comprises a component made of a first metal (e.g., a metal sheet, such as a sheet made of aluminum or aluminum alloy) and one or more fasteners (e.g., rivets, bolts, nails, cotter pins or other pins, studs, etc.) made of second metal that is different than the first metal, for example, as in the case where the fastener is used to secure the metal sheet or other component to a substrate (e.g., a plastic, wood, metal or other substructure; another sheet of metal; etc.). For example, in one illustrative embodiment, a sheet made of aluminum or aluminum alloy can be fastened with fasteners made of steel, copper, copper alloys, or other metals or metal alloys other than aluminum or aluminum alloy. The point of physical contact between the component and the fastener is a place where galvanic corrosion is enhanced. Frequently, such enhanced galvanic corrosion is reduced by physically isolating the fastener(s) from the metal sheet or other component(s) being fastened, for example, by using a non-conducting material (e.g., plastic, rubber, etc.). Using the method of the present invention, such enhanced galvanic corrosion can be further reduced by applying the coating to the surface of both the sheet and the fastener (e.g., such that the coating applied to the surface of the sheet is unitarily formed with the coating applied to the surface of the fastener) and, in some cases, sufficiently reduced so that physical isolation of the fastener(s) from the metal sheet (e.g., by use of the non-conducting material) is not required.

As used herein, the phrase "improve the metal's corrosion resistance" is meant to be broadly construed and can be ascertained by any suitable qualitative or quantitative method know to those skilled in the art. Illustratively, a metal's corrosion resistance can be determined by Prohesion™ exposure, for example, in accordance with ASTM D5894-96, which is hereby incorporated by reference. Any increase in the metal's corrosion resistance is to be deemed to "improve" its corrosion resistance. Increases in corrosion resistance can be determined, for example, visibly by comparing test samples coated in accordance with the method of the present invention to uncoated test samples or to test samples coated only with topcoat. As indicated above, the level of corrosion resistance can be ascertained qualitatively, as by the visual observation of blistering, peeling, curling, bubbling, or other indicia of coating failure or delamination or by the visual observation of pitting and other indicia of corrosion of the metal. Such observations can be made a single point in time (e.g., after Prohesion™ exposure in accordance with ASTM D5894-96 for about 1800 hours, about 2000 hours, about 2500 hours, about 3000 hours, about 3500 hours, about 4000 hours, about 4500 hours, about 5000 hours, etc.), or they can be made over a period of time.

As discussed above, the method of the present invention is carried out by applying, to the surface of the metal, a coating which comprises magnesium powder and which is substantially free of chromium.

"Magnesium powder", as used herein is meant to refer to a collection of micron-sized particles (e.g., particles having a diameter of about 1-1000 microns, such as of about 10-100 microns, etc.) which contain magnesium metal and/or the oxides thereof.

The particles which contain magnesium metal and/or the oxides thereof can further include one or more other metals or oxides of other metals, as in the case where the magnesium powder is a collection of micron-sized particles of a magnesium alloy (e.g., a magnesium alloy containing (in addition to magnesium) calcium, manganese, lithium, carbon, zinc, potassium, aluminum, and/or a rare earth metal (e.g., cerium); a magnesium alloy that is more reactive than aluminum; a magnesium alloy that is more reactive than Al 2024 T-3; and/or a magnesium alloy that is more reactive than Al 7075 T-6). Illustratively, suitable magnesium alloys include: (i) those which comprise magnesium and manganese, with or without calcium, lithium, carbon, zinc, potassium, aluminum, and/or a rare earth metal (e.g., cerium) being present; (ii) those which comprise magnesium and up to about 6%, by weight, of calcium, manganese, lithium, carbon, zinc, potassium, aluminum, and/or a rare earth metal (e.g., cerium); and/or those which contain magnesium and up to about 6%, by weight, of manganese. Mixtures of particles containing magnesium metal and particles containing magnesium alloys can also be employed and are meant to be encompassed by the term "magnesium powder", as used herein; "Magnesium powder", as used herein, is also meant to refer to mixtures of particles containing a first magnesium alloy and particles containing a second magnesium alloy. Illustratively, particles which make up the magnesium powder can include a magnesium metal core or a magnesium alloy core and a coating of magnesium oxide on the surface of the core.

It should be noted, in this regard, that reference here to "diameter" is not to imply that the particles which make up the magnesium powder are necessarily spherical: the particles can be spherical, ellipsoidal, cubical, rod-shaped, disk-shaped, prism-shaped, etc., and combinations thereof. In the case where a particle is other than spherical, "diameter" is meant to refer to the diameter of a hypothetical sphere having a volume equal to that of the particle. Thus, as used herein, "magnesium powder" is meant to include magnesium flake. "Magnesium flake", as used herein, is meant to refer to two-dimensional forms (i.e., forms having two large dimensions and one small dimension) of magnesium particles.

The particles contained in the magnesium powder can be of substantially uniform particle size or not. For example, the magnesium powder can include a mixture of two or more magnesium particle powders, each having different mean particle size distributions, such as in the case where the magnesium powder includes a first magnesium particle powder and a second magnesium particle powder, where the first magnesium particle powder and a second magnesium particle powder have substantially different mean particle size distributions. As used in this context, two mean particle size distributions, X and Y, are to be deemed to be "substantially different" when either the ratio of X:Y or the ratio Y:X is greater than about 1.5, such as greater than about 1.6, greater than about 1.7, greater than about 1.6, greater than about 1.8, greater than about 1.9, greater than about 2, from about 1.1 to about 4, from about 1.5 to about 3, from about 2 to about 2.5, from about 2.1 to about 2.5, and/or from about 2.2 to about 2.4. Additionally or alternatively, the first magnesium particle powder and the second magnesium particle powder can be selected such that the mixture's bulk density is greater than the first magnesium particle powder's bulk density and such that the mixture's bulk density is greater than the second magnesium particle powder's bulk density, for example, as in the case where the mixture's bulk density is at least about 2% greater (e.g., at least about 5% greater, at least about 8% greater, etc.) than the first magnesium particle powder's bulk density and such that the mixture's bulk density is at least about 2% greater (e.g., at least about 5% greater, at least about 8% greater, etc.) than the second magnesium particle powder's bulk density.

As further illustration, the magnesium powder used in the practice of the present invention can include a mixture of a first magnesium particle powder having a mean particle size distribution of from about 25 μm to about 35 μm (such as in the case where first magnesium particle powder has a mean particle size distribution of from about 27 μm to about 33 μm and/or as in the case where the first magnesium particle powder has a mean particle size distribution of about 30 μm) and a second magnesium particle powder having a mean particle size distribution of from about 65 μm to about 75 μm (such as in the case where second magnesium particle powder has a mean particle size distribution of from about 67 μm to about 73 μm and/or as in the case where the second magnesium particle powder has a mean particle size distribution of about 70 μm).

As yet further illustration, the magnesium powder used in the practice of the present invention can include a mixture of a first magnesium particle powder having a mean particle size distribution of from about 25 μm to about 35 μm and a second magnesium particle powder having a mean particle size distribution of from about 65 μm to about 75 μm, where the volume ratio of first magnesium particle powder to second magnesium particle powder is from about 40:60 to about 60:40, for example, as in the case where the volume ratio of first magnesium particle powder to second magnesium particle powder is from about 45:55 to about 55:45; as in the case where the volume ratio of first magnesium particle powder to second magnesium particle powder is from about 50:50 to about 55:45; and/or as in the case where the volume ratio of first magnesium particle powder to second magnesium particle powder is about 58:42.

As yet further illustration, the magnesium powder used in the practice of the present invention can include a mixture of a first magnesium particle powder having a mean particle size distribution of about 30 μm and a second magnesium particle powder having a mean particle size distribution of about 70 μm, where the volume ratio of first magnesium particle powder to second magnesium particle powder is from about 40:60 to about 60:40, for example, as in the case where the volume ratio of first magnesium particle powder to second magnesium particle powder is from about 45:55 to about 55:45; as in the case where the volume ratio of first magnesium particle powder to second magnesium particle powder is from about 50:50 to about 55:45; and/or as in the case where the volume ratio of first magnesium particle powder to second magnesium particle powder is about 58:42.

As discussed above, the method of the present invention is carried out by using a coating which (i) includes the aforementioned magnesium powder and (ii) a binder. The coating can include one or more other materials, such as other metal particles, solvents, and the like. Alternatively, the coating can be free of such one or more other materials. For example, the coating can be substantially free of chromium. As used herein, a coating is to be deemed to be "substantially free of chromium" if the ratio of the weight of chromium metal or ion in the coating to the weight of magnesium metal or ion in the coating is less than 20%, such as less than about 18%, less than about 15%, less than about 12%, less than about 10%, less than about 5%. less than about 2%, less than about 1%, less than about 0.5%, and/or about zero. Additionally or alternatively, the coating can be formulated so as not to contain added chromium.

As discussed above, the coating further (i.e., in addition to the magnesium powder) includes a binder.

The binder can be any suitable polymeric material (e.g., a polymer or copolymer) or a prepolymer (e.g., a monomer or oligomer) or combination of prepolymers which, upon polymerization or copolymerization, forms a polymer or copolymer. Illustratively, the binder can include a hybrid polymeric matrix or a plurality of hybrid polymeric matrices or other polymer composites or alloys that contain a polymer backbone with at least two types of reactive groups that can take part in crosslinking and network formation under at least two different mechanisms; and/or the binder can contain a prepolymer or combination of prepolymers which, upon polymerization or copolymerization, forms the aforementioned hybrid polymeric matrix, hybrid polymeric matrices, or other polymer composites or alloys.

For example, in one embodiment of the method of the present invention, the binder includes a polyisocyanate prepolymer and an epoxy prepolymer.

Suitable polyisocyanate prepolymers include, for example, aliphatic polyisocyanate prepolymers, such as 1,6-hexamethylene diisocyanate homopolymer ("HMDI") trimer, and aromatic polyisocyanate prepolymers, such as 4,4'-methylenediphenylisocyanate ("MDI") prepolymer. Combinations of two or more aliphatic polyisocyanate prepolymers, combinations of two or more aromatic polyisocyanate prepolymers, and/or combinations of one or more aliphatic polyisocyanate prepolymers and one or more aromatic polyisocyanate prepolymers can also be employed.

Suitable epoxy prepolymers include, for example, any common epoxy resin, such as those which include at least one multifunctional epoxy resin (i.e., an epoxy resin having two or more epoxy groups per molecule). Examples of such epoxy resins include polyglycidyl ethers of pyrocatechol, resorcinol, hydroquinone, 4,4'-dihydroxydiphenyl methane (or bisphenol F, such as RE-404-S or RE-410-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl)methane; polyglycidyl ethers of transition metal complex chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof. Among the commercially available epoxy resins suitable for use herein are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals, Tarrytown, N.Y.; and BREN-S from Nippon Kayaku, Japan. Combinations of the aforementioned epoxy prepolymers and other epoxy prepolymers can also be employed. Monofunctional epoxy resins, can also be used, for example, as a reactive diluent or crosslink density modifier.

The method of the present invention can also include contacting the binder with a crosslinker. Suitable crosslinkers include, for example, silanated tetrahydroquinoxalinols, such as 7-phenyl-1-[4-(trialkylsilyl)-butyl]-1,2, 3,4-tetrahydroquinoxalin-6-ol and other 7-phenyl-1-[4-(trialkylsilyl)-alkyl]-1,2,3,4-tetrahydroquinoxalin-6-ols. As used herein, 7-phenyl-1-[4-(trialkylsilyl)-butyl]-1,2,3,4-tetrahydroquinoxalin-6-ol is meant to include compounds having the following Formula I:

wherein each R is the same or different and represents an alkoxy group. "Alkoxy", as used in this context, is meant to refer to a group having the formula —OR' where R' is a substituted or unsubstituted alkyl (e.g., methyl, ethyl, n-propyl, isopropyl, n-butyl, isobutyl, t-butyl or other C1-C6 alkyl or other lower alkyl) or a substituted or unsubstituted aryl group. As used herein, 7-phenyl-1-[4-(trialkylsilyl)-alkyl]-1,2,3,4-tetrahydroquinoxalin-6-ol is meant to include compounds having the following Formula II:

wherein each R is as defined above with regard to Formula I and wherein R" is a propylene moiety (e.g., —CH$_2$CH$_2$CH$_2$—), a butylene moiety (e.g., —CH$_2$CH$_2$CH$_2$CH$_2$—), a pentylene moiety (e.g., —CH$_2$CH$_2$CH$_2$CH$_2$CH$_2$—), or other C1-C6 alkylene or other lower alkylene-containing bridging moieties.

The step of contacting the binder and crosslinker can be carried out, for example, prior to, or simultaneously with the step of applying the coating to the surface of the metal. Illustratively, the crosslinker can be combined with the binder in the coating formulation, and the coating formulation (containing crosslinker, magnesium powder, binder, etc.) can be applied in a single step. Alternatively, the crosslinker can be applied to the metal surface prior to applying the coating formulation (containing magnesium powder, binder, etc.). Still alternatively, the crosslinker can be applied to the metal surface prior to applying the coating formulation, and the coating formulation can contain additional crosslinker (in addition to containing magnesium powder, binder, etc.).

Whether or not a silanated tetrahydroquinoxal-inol crosslinker or other crosslinker is employed, the method of the present invention can further include the step of contacting the metal surface with an amine-containing organo-silane prior to the aforementioned step of applying a coating to the surface of the metal. A variety of amine-containing organo-silanes can be employed in this regard, such as amine-containing organo-silanes having the formula $H_2N-R^a-NH-R^b-S(OR^c)_3$, where each of $R^a$ and $R^b$ independently represents a methylene moiety (e.g., $-CH_2-$), an ethylene moiety (e.g., $-CH_2CH_2-$), a propylene moiety (e.g., $-CH_2CH_2CH_2-$), a butylene moiety (e.g., $-CH_2CH_2CH_2CH_2-$), a pentylene moiety (e.g., $-CH_2CH_2CH_2CH_2CH_2-$), or other C1-C6 alkylene or other lower alkylene-containing bridging moieties; and where $R^c$ is the same or different and represents an alkoxy group. Illustratively, suitable amine-containing organo-silanes include (N-β-(aminoethyl)-γ-aminopropyltrimethoxysilane, (N-β-(aminoethyl)-γ-aminopropyltriethoxysilane, (N-β-(aminoethyl)-γ-aminobutyltrimethoxysilane, and (N-β-(aminoethyl)-γ-aminobutyltriethoxysilane.

In cases where an amine-containing organo-silane is employed, subsequent to contacting the metal surface with the amine-containing organo-silane but prior to the step of applying the coating formulation (containing magnesium powder, binder, etc.) to the surface of the metal, the metal surface can be further contacted with polyisocyanate prepolymers, such as a polyisocyanate of MDI.

Figure 1A:
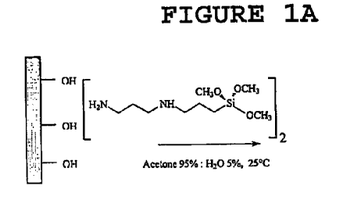
FIG. 1A shows a surface silation/amination layer.
Figure 1B:
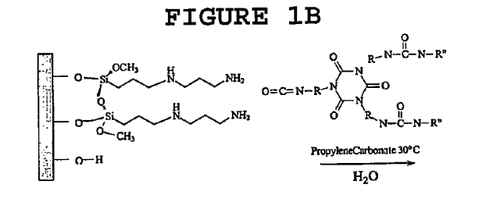
FIG. 1B shows sequential reaction of this layer with HMDI or MDI.
Figure 1C:
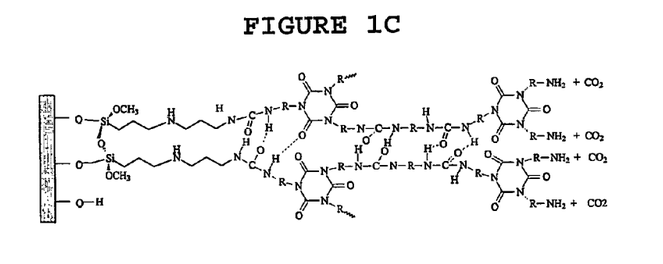
FIG. 1C shows a further polymerization that is surmised to take place from the surface layer and extending into the bulk.
Figure 1D:
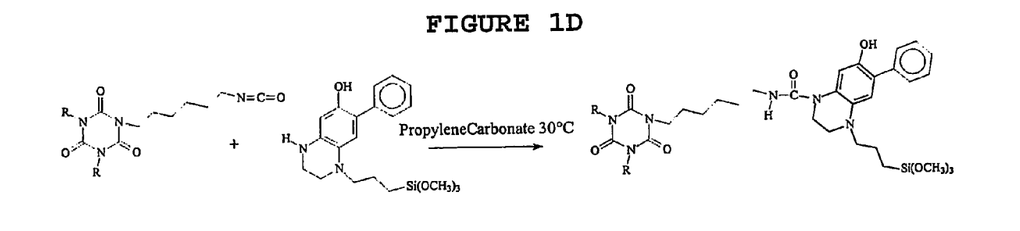
FIG. 1D shows a reaction of an isocyanate monomer and a crosslinker, 7-phenyl-1-[4-(trimethylsilyl)-butyl]-1,2,3,4-tetrahydroquinoxalin-6-ol depicting bulk epoxy/isocyanate interpenetrating network growth throughout the bulk phase.

When used together in the method of the present invention, it is believed that the amine-containing organo-silane, polyisocyanate prepolymers, epoxy prepolymers, and silanated tetrahydroquinoxalinol crosslinkers form a silane modified epoxy isocyanate hybrid binder which is bonded to the metal surface. For example, initial application of an amine-containing organo-silane can result in a surface silation amination layer, as shown in FIG. 1A. This layer is then reacted with the polyisocyanate prepolymers, such as HMDI and MDI, as shown in FIG. 1B; and, as shown in FIG. 1C, further polymerization is surmised to take place from the surface layer and extend into the bulk. More particularly, hydrolysis (e.g., with atmospheric or other ambient moisture) of the isocyanate can form carbamic acid (forming both amines and carbon dioxide that are intermediates in a Hoffmann rearrangement of an isocyanate with water) to yield a reactive/reaminated layer and a covalent structure with hydrogen bonded parallel multi layers. The bulk reaction, extending form the surface occurs between (i) the polyisocyanate in the binder formulation and the aminated surface (e.g., as discussed above and shown in FIG. 1C) and (ii) the polyisocyanate and the silanated tetrahydroquinoxalinol crosslinker (for example, as shown in FIG. 1D) which is surmised upon further hydrolysis to form both polyurea and polysiloxane interpenetrating network ("IPN") structure. In this manner, for example, a silane modified epoxy isocyanate hybrid binder material can be prepared from a polymeric material consisting of polyurea, polyurethane (from polyisocyanate prepolymer), epoxy-amine, and organo-silane linkages.

Although the above discussion focuses on organic binders, inorganic binders can also be employed; and "binder", as used herein, is meant to include organic binders, inorganic binders, and combinations thereof.

Suitable inorganic binders which can be used in the practice of the present invention include those described in Klein, "Inorganic Zinc-rich" in L. Smith ed., *Generic Coating Types: An Introduction to Industrial Maintenance Coating Materials*, Pittsburgh, Pa.: Technology Publication Company (1996), which is hereby incorporated by reference. For example, inorganic binders having a modified $SiO_2$ structure (e.g., produced from silicates or silanes that hydrolyze upon exposure to atmospheric moisture) can be used as inorganic binders.

Other binders that can be used in the practice of the present invention include conducting binders. For example, such conducting binders can be made of inherently conducting polymers, such as doped polyaniline or doped polypyrrole. Other such conducting binders include organic polymers or other polymeric materials that are doped with conductive pigment of very small size, such as carbon black. Still other such conducting binders include organic polymers or other polymeric materials that are doped with a pigmentary form of an inherently conducting polymer. It is believed that magnesium-rich coating formulations containing conducting binders can extend the lifetime of effectiveness of such a coating, for example, by increasing the electrical connectivity (e.g., from about 30-50% to about 90-100% volume fraction of Mg) to the magnesium via the conductive binder.

As discussed above, the method of the present invention is carried out by applying the coating discussed above (i.e., the coating formulation containing crosslinker, magnesium powder, binder, etc.) to the surface of the metal whose corrosion resistance is to be improved.

The coating can be applied in the form of a suspension, dispersion, or solution in a suitable solvent or combination of solvents, examples of which include polypropylene carbonate, ethyl-3-ethoxypropionate ("EEP"), and combinations thereof. Application can be carried, out for example, by any suitable technique, such as spraying (e.g., airless spraying or spraying with the use of air), brushing, rolling, flooding, immersion, etc., to achieve a suitable coating thickness, such as from about 10 to about 100 microns, from about 30 to about 80 microns, from about 40 to about 60 microns, and/or about 50 microns.

As also discussed above, the coating can be applied directly to the metal's surface; or it can be applied indirectly to the metal's surface.

In one example where the coating is applied indirectly to the metal's surface, prior to the application of the coating, the metal's surface can be first contacted with an amine-containing organo-silane. Where an amine-containing organo-silane is employed, contact between the amine-containing organo-silane and the metal surface can be carried out, for example, using any suitable technique, such as spraying (e.g. airless or otherwise), brushing, rolling, flooding, immersion, and the like, for example, as described in Walker, "Organo Silanes as Adhesion Promoters for Organic Coatings," *Journal of Coatings Technology*, 52(670): 49-61 (1980), which is hereby incorporated by reference. The amine-containing organo-silane can be applied in the form of a 1-4%, by weight, solution of amine-containing organo-silane in an appropriate solvent, such as a solvent containing water and acetone. For example, one suitable amine-containing organo-silane solution contains 80 wt % of water, 18 wt % of acetone, and 2 wt % of Silquest™ A-1120 silane (N-β-(aminoethyl)-γ-aminopropyl trimethoxysilane). Where used, the amine-containing organo-silane solution can be contacted with the metal surface so as to form a film of suitable thickness, such as from about 0.2 to about 2 mil wet thickness, and the film can be allowed to set (e.g., for from about 5 minutes to about 2 hours; for from about 15 minutes to about 1 hour; and/or for about 30 minutes) prior to further coating.

The metal surface, thus treated with amine-containing organo-silane can be contacted with polyisocyanate prepolymers, such as a polyisocyanate of MDI, prior to applying the coating formulation (containing magnesium powder, binder, etc.). Where polyisocyanate prepolymers are employed, contact between the polyisocyanate prepolymers and the amine-containing organo-silane treated metal surface can be carried out, for example, using any suitable technique, such as spraying (e.g. airless or otherwise), brushing, rolling, flooding, immersion, and the like. The polyisocyanate prepolymers can be applied in the form of a 2-10 %, by weight, solution of polyisocyanate prepolymers in an appropriate solvent, such as an aromatic hydrocarbon solvent (e.g., xylenes). For example, one suitable polyisocyanate prepolymer solution contains 95 wt % of xylenes and 5 wt % of Desmodur™ E23-A (a polyisocyanate of MDI). Where used, the polyisocyanate prepolymer solution can be contacted with the amine-containing organo-silane treated metal surface so as to form a film of suitable thickness (such as from about 0.2 to about 4 mil wet thickness, from about 0.5 to about 2 mil wet thickness, and/or about 1 mil thickness), and the film can be allowed to set (e.g., for from about 5 minutes to about 2 hours; for from about 15 minutes to about 1 hour; and/or for about 30 minutes) prior to application of the coating (i.e., the coating formulation containing crosslinker, magnesium powder, binder, etc.), for example, as described above.

Once applied directly or indirectly to the metal surface, for example, as described above, the coating (i.e., the coating formulation containing crosslinker, magnesium powder, binder, etc.) can be cured, for example, for from about 1 week to about 1 month, such as for about two weeks, at a temperature of from about room temperature to about 50° C., such as at from about 30° C. to about 40° C. and/or at about 35° C.

The coating can be top coated using any compatible topcoat formulation, such as Extended Lifetime™ Topcoat, for example by spraying or brushing to achieve a topcoat thickness of from about 20 to about 200 microns, such as from about 50 to about 150 microns, from about 80 to about 120 microns, and/or about 100 microns.

The inventors have found that corrosion resistance (as determined by Prohesion™ exposure in accordance with ASTM D5894-96, which is hereby incorporated by reference) in excess of 3,000 hours on 2024 T-3 aluminum alloy can be achieved with the methods of the present invention.

The coating can include, in addition to magnesium powder, other materials. In one embodiment, the coating further includes a rare earth metal, such as cerium. The cerium can be present in the form of cerium metal, cerium oxides, cerium salts, or combinations thereof. The cerium can be applied to the magnesium powder or a portion thereof, for example in the form cerium nitrate or other cerium salt. For example, in cases where the magnesium powder includes a mixture of two or more magnesium particle powders, each having different mean particle size distributions, such as in the case where the magnesium powder includes a first magnesium particle powder and a second magnesium particle powder, where the first magnesium particle powder's mean particle size distributions is less than 20 μm and where the second magnesium particle powder's mean particle size distributions is greater than 20 μm, the cerium can be applied to the surface of the first magnesium particle powder but not to the second magnesium particle powder. Additionally, or alternatively, the cerium metal, oxide, or salt can be dispersed in a binder used in the coating. Still additionally or alternatively, the cerium metal, oxide, or salt can be applied to the metal surface, e.g., in the form of cerium nanoparticles, prior to applying the coating thereto, for example, as in the case where the method of the present invention further includes a step of pretreating the surface of the metal with cerium ion.

Certain aspects of the present invention are further illustrated with the following examples.

EXAMPLES

Example 1

Initial Electrochemical and Exposure Studies

Figure 2A:
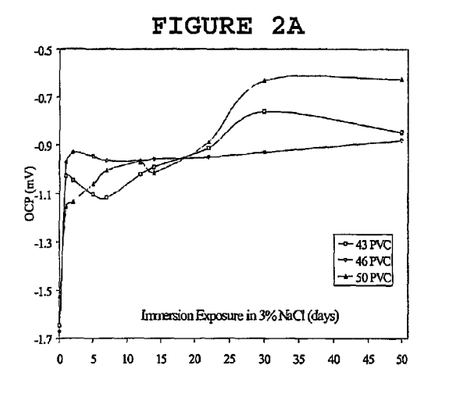
FIG. 2A is a graph of an open circuit potential SCE vs PVC for Mg-rich epoxy/polyamide primers at pH=6.2 in 3% NaCl.
Figure 2B:
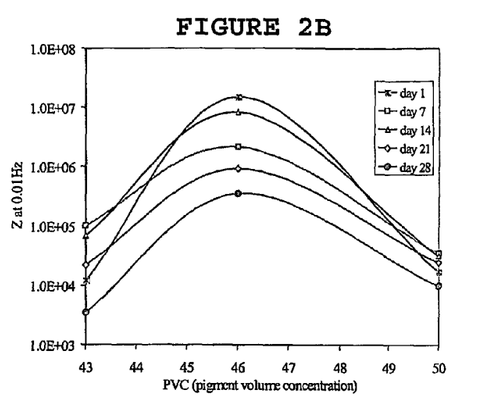
FIG. 2B is a graph showing |Z| modulus at 0.01 Hz vs PVC for Mg-rich epoxy/polyamide primers at pH=6.2 in 3% NaCl.

A. Open Circuit Potential and Electrochemical Impedance Spectroscopy EIS Studies The electrochemical studies of Mg-rich primers (without topcoat) formulated in our laboratory were first carried out on the surface of the primed Al 2024 T-3 alloy immersed in 3% NaCl solution. The corrosion potential, $E_{corr}$, or open circuit potential (OCP), for the coatings in contact with the alloy was monitored and the (EIS) spectra of three primer sets, as formulated in an epoxy-polyamide polymer matrix, were recorded as a function of time. The OCP is the mixed potential achieved when a corrosion reaction is occurring between the anode and cathode of the reaction system. The data presented in FIGS. 2A and 2B are for three of these primers based on Eckart (Eckagranules™) ~50 micron average particle size distribution (PSD) Mg powder at 43, 46 and 50% PVC. These data indicate that the most effective protection from just the primer is about 46% PVC, which was the estimated CPVC for this system.

FIG. 2A gives (OCP) vs. exposure time for Mg-rich primers, formulated at 43, 46, and 50% PVC in a polyamide/epoxy coating polymer exposed to 3% NaCl solution at pH~6.2. Interpretation of the events is as follows. Initial OCP values for the three sets correspond to a single electron transfer potential for Mg metal, $E_{Mg}$=−1.50V to −1.60 $V_{SCE}$, and the primers appear to be acting like bare Mg. Subsequently, over a 24 hour period, Mg and the Al alloy polarize to a mixed potential corresponding to the corrosion potential, $E_{corr}$, at which the Mg is still sacrificially protecting the Al 2024 whose $E_{2024}$ is −0.68 V vs. saturated calomel electrode (SCE). The observed mixed potential for Mg and Al alloy in 3% NaCl was found to be about $E_{corr}$=−0.90 V to −1.00 $V_{SCE}$. OCP values extending beyond the initial 24-hour period varied according to primer PVC. The initial lower mixed potential value, $E_{corr}$ (FIG. 2A), for the 43% PVC sample is thought to be due to the lower effective active metal area as a result of higher polymer coverage at the Mg/Al alloy interface. Initially, the Mg-anode dominates the OCP. The gradual rise in OCP for the 43% PVC sample toward $E_{2024}$=−0.68 $mV_{SCE}$ is assumed to be due to reactive consumption of the exposed Mg in this system and the disbanding of epoxy coating polymer from the cathode surface. The gradual decrease in OCP of the 43% PVC sample toward $E_{mix}$=−0.90 V to −1.00 $V_{SCE}$ may be due to resistance polarization by the formation and packing of Mg oxides in the coating. The initial and continuous decrease in OCP of the 50 PVC sample is concluded to be due to a higher void volume in the primer as well as a higher cathode area at the primer alloy interface. The OCP of the 46% PVC sample quickly arrives at the $E_{mix}=-0.90$ V to $-1.00$ $V_{SCE}$ value and remains constant for the duration of the test time period. Thus, it is surmised that the 46% PVC primer corresponds to the critical pigment volume concentration (CPVC) for the primer, suggesting that cathodic protection of the Al alloy due to Mg metal occurs most effectively at or near CPVC. FIG. 2B shows the impedance modulus |Z| versus exposure time measured in 3% NaCl solution at pH=6.2 on 43%, 46%, and 50% PVC Mg-rich primers. This figure demonstrates the effect of PVC at CPVC for Mg-rich primers. The Z modulus values for the 46% PVC samples yielded a higher impedance modulus over the 28-day period suggesting proper formulation at or near the critical pigment volume concentration, which is required to ensure close packing of Mg pigment with minimum resistance from the polymer matrix of the system, but with polymer matrix content sufficient enough to ensure good substrate wetting and reasonable physical properties from the primer.

Trends in OCP data suggest three distinct periods that distinguish the evolution and effectiveness of cathodic protection in the Mg-rich primers as a function of exposure time. These are as follows.

Period I. Initial immersion day one, the "activation" period when the value of the corrosion potential shifts to a cathodic value $-1.1V$ vs SCE, corresponding to the Mg metal/Al 2024 T-3 mixed potential in the electrolyte. Magnesium immediately begins to react with the sodium-chloride solution; it is "activated" leading to better metal-to-metal electrical contact being established between magnesium particles and Al surface.

Period II. Once initially past the "activation" period, the cathodic protection mechanism reaches its peak due to a maximum in the ratio of magnesium-to-aluminum area ratio. This occurs around day 5~7 when the corrosion potential shifts to a more anodic value of about $-0.9V$ vs SCE; it is where a relative stabilization called the "transition" period occurs.

Period III. After the transition period, and up to day 21, the corrosion potential shifts out of the cathodic protection domain, and the potential fluctuates as the film's solution chemistry begins to change. At this time, oxygen reduction begins to occur on the upper part of the film causing a local increase in pH that changes the corrosion products from magnesium hydoxychlorides to magnesium hydroxides, the same as at the interface.

B. Initial Accelerated Test

In metal-rich coatings, the pigment volume concentration (PVC), is high and close to critical PVC, in the region at which paint properties such as water permeability and cohesive strength change dramatically. Therefore, Prohesion™ cyclic exposure in dilute Harrison's solution with no topcoat allows easy access of acidic electrolyte, atmospheric oxygen, $CO_2$ and water to the coating's Mg anode. Topcoating the Mg-rich primer insulates or screens it from the primary cyclic effects of Prohesion™ which in turn prevents observation of the processes that occur when the coating is scratched or chinked when the Al alloy is exposed to an acid rain environment. In order to better observe the occurrence of such processes, primed panels were directly exposed to dilute Harrison's solution, without topcoat, and monitored. The pH of dilute Harrison solution is about ~4.5 which corresponds to the pH at which Mg metal readily forms salts with $CO_2$, $SO_4^{2-}$ and $OH^-$. The formation of these salts was observed to occur on the surface and at the interface of the primer over a given time interval that corresponds to three distinct events:

1. EDXA spectra have revealed formation of magnesium carbonate hydrates at the primer liquid/vapor interface, dypingite [$Mg_5(CO_3)_4(OH)_2.8H_2O$] and hydromagnesite [$Mg_5(CO_3)_4(OH)_2.4H_2O$]. These salts have been observed only to be present up to the first 500 hours of exposure for all non top-coated primed Mg-rich panels tested.

2. For exposure times beyond 500-hours, brucite [$Mg(OH)_2$] domains begin to form and subsequently extend throughout the bulk of the primer. During this time the aluminum alloy remains cathodically protected as scribed lines remain unblemished.

3. For exposure times greater than 1,300 hours, primer failure and film delamination correspond to the accumulation of hexahydrite [$(MgSO_4).6\ H_2O$] compound at the interface. Failure occurs when Mg-metal and brucite structure have been depleted from the coating polymer matrix and sufficient hexahydrite salts have accumulated at the alloy interface, at which time the coating polymer ruptures and fragments from compressive forces exerted by hexahydrite structures.

The first 24 hours of exposure to salt fog solution with atmospheric $CO_2$, magnesium forms magnesium carbonate compound, at the surface, $Mg_5(OH)_5.CO_3$, which is replaced by a more densely packed magnesium hydroxide $Mg(OH)_2$ pseudo-hexagonal crystal structure. The rosette structure observed in the magnesium epoxy primer scanning electron microscopy (SEM) images is consistent with brucite magnesium hydroxide $Mg(OH)_2$ (acicular needle) crystal formed in Prohesion™ exposure. Further observations were made on the Mg-rich primers exposed to Prohesion™ cyclic salt fog with dilute Harrison's solution. First, white oxide area magnesium hydroxide (brucite) formed over magnesium metal and energy dispersed X-ray analysis (EDXA) measurements indicated the presence of magnesium, oxygen and aluminum with a minimum amount of carbon detected. Second, in the scribed area with no epoxy matrix or magnesium metal originally present, EDXA spectra show carbon, oxygen, magnesium and aluminum with possible presence of dypingite (magnesium carbonate) structure over the exposed aluminum surface.

In summary, Table 1 gives the relative pH, the solubility product, and the water solubility for magnesium salts identified in EDXA spectra. It was observed that the salts generated during the first 1,000 hours of exposure increased in local pH according to a stratification scheme from the coating/alloy surface interface toward the external surface of the coating.

TABLE 1

Magnesium Salts Solubility pH

| Salt | (designation) | Ksp | $H_2O$ g/100 ml | pH |
|---|---|---|---|---|
| $Mg(OH)_2$ | Brucite | $7.1\%\ 10^{-12}$ | $7.8\%\ 10^{-4}$ | 9.6~10.4 |
| $MgCO_3 \cdot 5H_2O$ | Magnesite | $3.8\%\ 10^{-6}$ | 0.002 | 8.0~8.8 |
| $MgSO_4 \cdot 6H_2O$ | Hexahydrite | (soluble) | 95 | 6~9 |

The degradation process of Mg-rich coatings exposed to an acidic environment may be described as follows. The more acidic salt (i.e., hexahydrite) was identified at the alloy interface where local pH conditions are lower due to anodic polarization conditions that drive cationic species, such as $Al^{3+}$ from solution towards the Al interface. The carbonate salt was found to develop on the top of the coating along with $Mg(OH)_2$, and both are identified as species that form at higher pH. In addition, the damaged/scribed areas did not degrade neither the coating polymer nor the alloy surface until after the depletion of $Mg(OH)_2$ and as the accumulation of hexahydrite salts occurred. It has been reported that aqueous magnesium hydroxide acts a pH buffer that does not exceed a pH=10.5, even in the presence of excess $Mg(OH)_2$.

C. Conclusions of Preliminary Feasibility Studies

These very encouraging results were obtained from a simple Mg-rich coating based on an off-the-shelf (OTS) polymer system with no optimization efforts. They showed that the oxidation products of the Mg pigment in an exposure environment, fairly typical of what an actual system might see in field exposure, did not cause basic corrosion of the Al 2024 T-3 alloy. Further, the Mg-rich system did provide cathodic protection to the Al 2024 T-3, giving the system significant corrosion protection properties in a completely Cr-free system with no chromates in pretreatment nor chromate pigments in primer. Our studies proceeded to improve the coating polymer system and additional formulation studies. These studies are described in Example 2.

Example 2

Formulation Improvement by Coating Polymer Design and Preparation

A. Coating Polymer Selection

Traditionally, two-pack zinc epoxy/polyamide polymer materials have been used for cathodic protection of steel as they result in crosslinked matrices with a good adhesion and resistance against alkalis, so that any alkaline reaction involving zinc does not affect the binder itself (Van Vliet, *Prog. Organic Coatings*, 34:220-226 (1998), which is hereby incorporated by reference). More recently, epoxy siloxane "hybrid" coatings have been reported (Keijman, High Solids Coatings: Experience in Europe and USA—Paper 40, *Proceedings PCE Conference*, The Hague, The Netherlands "Protecting industrial and marine structures with coatings", March 1997, which is hereby incorporated by reference) to represent a significant advancement compared to epoxy, epoxy acrylic and polyurethane coatings. Hybrid polymeric matrices, for high performance primers, are designed as polymer composites or alloys that contain a polymer backbone with at least two types of reactive groups that can take part in crosslinking and network formation under at least two different mechanisms.

B. Silane Modified Multi-Layer/IPN Polymer Matrix

The design of an improved polymeric matrix for Mg-rich coatings involves an easy to prepare multi-layer scheme that requires minimum preparation of the Al alloy surface and is derived from existing sol-gel technology. The reaction scheme entails initial application of an organo-silane (N-β-(aminoethyl)-γ-aminopropyltrimethoxy-silane) with subsequent grafting of organic layers from the surface into the bulk by utilizing a novel silane modified crosslinker. The coating scheme is akin to the "sol-gel" process, but involves a multi-layer approach that utilizes an organo-silane substrate treatment from which a moisture-cure polyisocyanate is applied which is believed to involve an initial reaction with water to form an unstable carbamic acid intermediate that spontaneously decarboxylates into an amine and carbon dioxide, as shown in FIGS. 1A-1C. To complete the scheme, further bulk crosslinking reactions between epoxy, silanol, and isocyanate are proposed to occur with from an aminated surface into the bulk by employing a bulk/surface crosslinker. In brief, the prepared organo-silane modified surface was subsequently sprayed with a 20 percent solution of polyisocyanate in propylene carbonate, with one of two poly isocyanate prepolymers, (i) 1,6-hexamethylene diisocyanate homopolymer (HMDI) trimer (as depicted in FIGS. 1A-1C) and (ii) 4,4'-methylenediphenylisocyanate (MDI) prepolymer similar scheme. Uniform coverage of the wet surface was approximated at ~2 mils (50 microns) using a wet film thickness gauge.

The bulk reaction, extending from the surface, occurs between (i) the polyisocyanate, in the primer formulation and the aminated surface (FIG. 1C) and (ii) the isocyanate and 7-phenyl-1-[4-(trimethylsilyl)-butyl]-1,2,3,4-tetra-hydroquinoxalin-6-ol crosslinker (FIG. 1D) which is surmised upon further hydrolysis to form both polyurea and polysiloxane IPN structure. The silane modified epoxy (HMDI or MDI) hybrids results from a polymeric material consisting of polyurea, polyurethane (from polyisocyanate prepolymer), epoxy-amine, and organo-silane linkages.

C. Coating Formulations

The materials used in this study are summarized in Table 2.

TABLE 2

Magnesium Rich Primer Materials

| Formulation | Materials |
| --- | --- |
| (A) Hyb-E23A | Desmodur ™ E23-A, Aerosil R202, Eckagranules ™ PK51/31, Epon ™ 1001CX, Propylene Carbonate/EEP |
| (B) MC-PUR* | Desmodur ™ E23-A, Bentone ® 34, Eckagranules ™ PK51/31, Anti Terra ®U, Aromatic solvent Xylol |
| (C) Hyb-N3300 | Desmodur ™ NC-3300, Aerosil ™ R202, Eckagranules ™ PK51/31, Epon ™ 1001CX, Propylene Carbonate/EEP |
| (D) Epoxy-Polyamide | Epon ™ 828, Epicure ® 3115, Aerosil ™ R202, Eckagranules ™ PK51/31, Anti Terra ™ U, Aromatic solvent Xylol |

*Adapted from: Bayer Desmodure ™ E-23A Moisture Cure Urethane, Zinc Rich Primer, Formulation # 294-35, which is hereby incorporated by reference.

Example 3

Mg-rich Coatings Formulation and Characterization Studies

A. Critical Pigment Volume Concentration Estimates for Mg-rich Primers

Figure 3A:
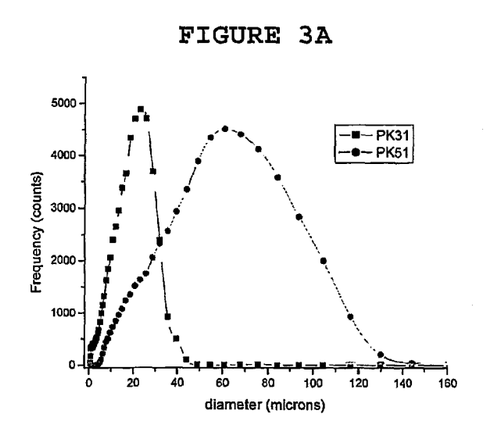
FIG. 3A is a graph showing particle size distributions for Mg powders, Eckagranules™ PK31 and PK51.
Figure 3B:
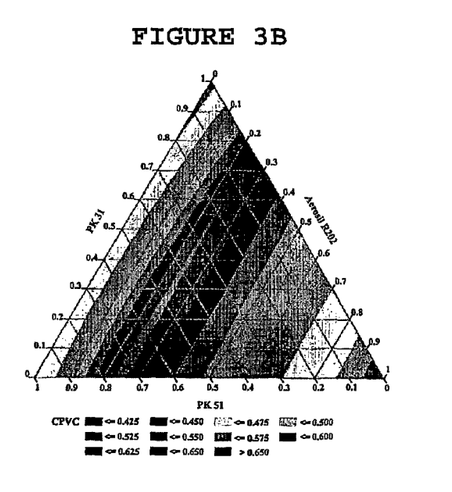
FIG. 3B is a ternary mixture diagram for PK31, PK51, and Aerosil™ R202 showing regions corresponding to theoretically calculated CPVC's.
Figure 4A:
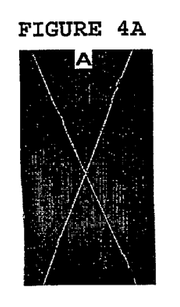
FIGS. 4A-4D are images showing results from a modified UL-94 flammability test for 50% PVC hybrid epoxy/urea/urethane N3300 (FIG. 4A); 50% PVC hybrid E23A (FIG. 4B); 50% PVC MC-PUR (FIG. 4C); and 50% PVC epoxy-polyamide (FIG. 4D).
Figure 4B:
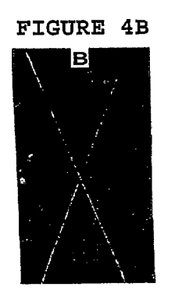
Figure 4C:
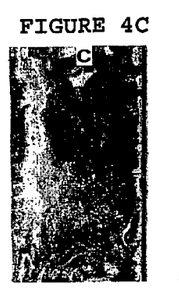
Figure 4D:
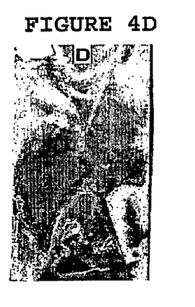
Figure 5A:
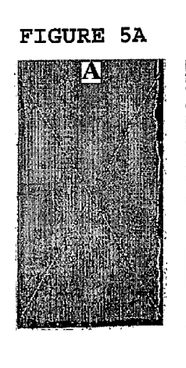
FIGS. 5A-5D are images showing results from a Prohesion™ test conducted in accordance with ASTM D5894-96) for Al 2024 T-3 panels coated with the formulation set forth in Table 2, entry C (Mg-rich primer hybrid N3300 at 50% PVC with ELT™ topcoat at 0 hours (FIG. 5A); at 1200 hours (FIG. 5B); at 3000 hours (FIG. 5C); and at 4800 hours (FIG. 5D).
Figure 5B:
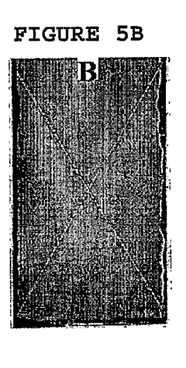
Figure 5C:
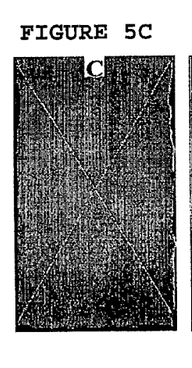
Figure 5D:
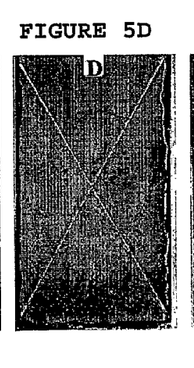
Figure 5E:
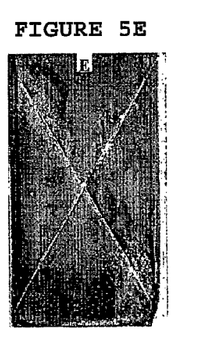
FIG. 5E is an image showing the result from a Prohesion™ test conducted in accordance with ASTM D5894-96) for a Al 2024 T-3 panel coated with an epoxy Epon™828/Ancamide™ 2353 polyamide (a non-pigmented primer) with ELT™ topcoat at 1800 hours.

Critical pigment volume concentration (CPVC) is a function of the random dense packing efficiency of the pigment plus adsorbed layer thickness (d), which must be experimentally determined. This has been discussed extensively in the literature and a recent review (Bierwagen et al., "Recent Studies of Particle Packing in Organic Coatings," *Prog. Organic Coatings*, 35:1-10 (1999), which is hereby incorporated by reference) considers new developments. The procedure for obtaining CPVCs for these Mg-rich systems is described as follows. Two magnesium powders, Eckagranules™ PK31 with a mean particle size distribution (PSD) of 30 μm, and Eckagranules™ PK51 with a mean PSD of 70 μm (see FIG. 3A), were used as received, and mixed at a 52%-PK31: 48%-PK51 volume. A 52:48 volume mix of the two powders was found to yield a higher bulk density value than that of either powder alone. The critical pigment volume concentration (CPVC) of the primers was first approximated by obtaining a resin/powder rub-up value with Aerosil™ R202 at 2% vol. on total pigment, and the final CPVC was calculated from PSDs, provided by Eckart GmbH, for the three pigments, assuming spherical geometry, combined with the experimentally determined resin rub-up values. FIG. 3B shows calculated CPVCs from the ternary diagram for the three-pigment mixture. The volume fraction coordinates (PK31=0.51, PK51=0.47, and R202=0.02) yields a theoretic CPVC value in the region where PVC=0.475, which corroborates the experimentally surmised CPVC, ascertained from the EIS data in FIGS. 2A and 2B.

B. Characterization of Mg-Rich Coatings Properties

1. Panel and Film Preparation. The primers from materials in Table 2 were applied to 6"×3" Al 2024 T3 Q-panels™, scrubbed with a Scotch Brite™ pad, rinsed and degreased with ethyl-3-ethoxypropionate ("EEP"), then immersed in a 10% phosphoric acid solution for 60 seconds and rinsed with distilled water. Al panels were surface modified according to methodology described in Walker, "Organo Silanes as Adhesion Promoters for Organic Coatings," *Journal of Coatings Technology*, 52(670): 49-61 (1980), which is hereby incorporated by reference. Mg-rich coatings were applied with a touch-up spray gun, and the coatings were cured at 35° C. for 14 days. Primed panels were subsequently top coated with Extended Lifetime™ Topcoat. The average film thickness (FT) ascertained from SEM and EDAX images reveal primer film thickness to be estimated at about 50±20 microns with topcoat film thickness estimated at about 100±40 microns.

2. Micrographs SEM and EDAX. Coated samples were assembled on aluminum mounts and coated with gold using a Technics Hummer II sputter coater. SEM and EDAX images were obtained using a JEOL JSM-6300 Scanning Electron Microscope. X-ray information was obtained by a ThermoNoran EDX detector using a VANTAGE Digital Acquisition Engine. EDAX cross sections of the four 50 PVC Mg-rich primers, with pigmentary Mg X-ray fluorescence (XRF) counts in red, and Silicon XRF counts, in blue, demonstrated the general alignment of Mg powder at the Al interface and pigment distribution in the polymer matrix which is thought to be related to its dispersion in the coating's polymer matrix and ultimately to its degree of effectiveness as a coating for corrosion control.

C. Testing of Mg-rich Coatings

1. Mechanical Properties of Mg-Rich Coatings. Tensile properties were measured according to (ASTM D 2370-82) using an Instron™ model 5542 with Merlin (2) software. DMTA measurements were made with a Rheometrics model 3-E dynamic mechanical analyzer.

2. Flammability Testing of Mg-Rich Coatings. Six-inch strips were cut from top-coated Mg-rich Al panels and subjected to a modified flammability test, referenced in document IPC-SM840B (International Printed Circuit), and also described in U.L.-94 flammability specification using a Bunsen burner, with a tube length of 4 inches, I.D. of 0.37 inches with methane gas at equivalent 1000 BTU/ft³. A propane torch with flame temperature 1120° C. (2048° F.) was applied for thirty seconds to the backside of the aluminum panel covered with coatings. This test was further modified by scribing an X over the face of each panel to directly expose magnesium metal in the coating to air/oxygen.

3. Exposure Testing. Prohesion™ exposure was performed according to ASTM D5894-96. Top-coated Mg-rich panels were prepared by covering panel backside and edges with 3M electroplater's tape, and edges were then sealed with a 2-K industrial epoxy form Aldrich. Topcoated panels were scribed through the surface of the coating with a carbide tip glass scribe where an X pattern was formed, thus exposing the Al surface.

4. Electrochemical Impedance Spectroscopy (EIS). The corrosion protection properties of primed panels were evaluated by EIS. The experimental set-up consisted of a three-electrode cell containing 40 ml of 3.0 wt % NaCl aqueous solution, open to air, held at room temperature ~22° C./72° F. A saturated calomel electrode (SCE) was used as the reference electrode and a stainless steel plate served as the counter-electrode. All measurements were performed at the open circuit potential of the system. EIS measurements were performed with a Gamry PC-4/300TM electrochemical measurement system with potentiostat-galvanostat. Impedance spectra were recorded with a frequency sweep from 0.01 Hz to 10 kHz; the amplitude of the signal perturbation was 10 mV (rms); and Gamry 3.1 Framework™ software was used to analyze the data in Bode plot form. These results are presented in Example 4.

Example 4

Test Results

A. Viscoelastic Properties of Coating Polymers

Table 3 gives the measured viscoelastic properties for five polymer systems: Tg, elastic storage modulus E' (minimum), and calculated crosslink density. The significant differences in reported glass transition temperatures are assumed to be related to the individual coatings chemical properties at full cure. Crosslink density was calculated from (E'): ($T=T_g+50°$ C.) at which the material is in the rubbery state; where $v_e$ is the elastically effective crosslink density: $v_e=3E'/RT(T+T_g)$.

TABLE 3

Viscoelastic Properties of Polymer Films

| Polymer film | $T_g$ (° C.) | Crosslink density (mol/cm³) | E' (Pa) minimum |
|---|---|---|---|
| N3300 (MC-PUR) | 122 | $3.4 \times 10^{-3}$ | $2.6 \times 10^7$ |
| E23A MC-PUR | 159 | $5.8 \times 10^{-4}$ | $6.6 \times 10^5$ |
| Epoxy-polyamide | 65 | $2.1 \times 10^{-3}$ | $2.0 \times 10^7$ |
| Hyb-N3300 | 96 | $1.3 \times 10^{-3}$ | $1.3 \times 10^7$ |
| Hyb-E23-A | 100 | $6.9 \times 10^{-4}$ | $6.9 \times 10^6$ |

The results in Table 3 also suggest the difference in the chemical composition of crosslinks formed may lead to observed differences in $T_g$s. According to Hale and Macosko (Hale et al., *Macromolecules*, 24:2610 (1991), which is hereby incorporated by reference), changes in Tg arise both from disappearance of chain ends and the formation of chemical crosslinks that yield elastically effective chain density at higher levels of branching.

B. Mechanical Properties of Mg-Rich Coatings

Table 4 gives the measured tensile properties of coating polymer films. Tensile tests were conducted on coating polymer film strips with no visible voids. Mechanical properties in Table 4 show an improvement in both of the hybrid system's tensile strength and tensile modulus properties over their parent materials. The tensile modulus is known to be a better indication of a film's mechanical properties, as its measurement is less defect dependent than the film's tensile strength. A high tensile modulus also suggests that the material is more elastic which implies higher degree of cure or conversion.

TABLE 4

Mechanical Properties of Polymer Films

| Polymer film | Elongation at break (%) | Tensile strength (MPa) | Tensile modulus (MPa) |
|---|---|---|---|
| N3300 (MC-PUR) | 8.0 ± 0.1 | 45 ± 7 | 1250 ± 90 |
| E23A MC-PUR | 5.0 ± 0.3 | 25 ± 6 | 825 ± 110 |
| Epoxy-polyamide | 18.0 ± 0.1 | 5 ± 0.9 | 150 ± 50 |
| Hyb-N3300 | 6.0 ± 0.3 | 56 ± 9 | 1800 ± 50 |
| Hyb-E23-A | 5.5 ± 0.2 | 50 ± 5 | 1500 ± 50 |

Both of the hybrid silane modified epoxy-urea/urethane analogs show lower $T_g$s than the parent materials with no significant difference in crosslink density, suggesting the presence of (—N—R—Si—O—Si—R—N—) bonds throughout the IPN matrix.

C. Flammability

Flame retardant (FR) coatings describe coatings that delay ignition and hinder flame spread. The common test method for evaluating flammability is the Limiting Oxygen Index (LOI) test (ASTM D 2863), a material is normally considered as flammable if the LOI is less than 26. Theses coatings were all coated with a fluorinated ELT™ topcoat that may have contributed in some measure to the coatings non-flammability (FIGS. 4A-4D). The most often reported parameter associated with coating flammability is the material's limiting oxygen index (LOI) value. Epoxy/polyamine systems vary from a low of 24 to a high of 32 for silane modified ceramer epoxies while fluorinated polyurethanes are rated up to 50. Another contributing factor to improved non-flammability is the presence of the isocyanurate linkage. HMDI has been reported to possess an inherently higher thermal stability than that of other urethane linkages, such as MDI, as the latter is reported to dissociate at about 200° C. In general, flammability decreases as the proportion of isocyanurate trizine ring increases.

D. Accelerated Exposure

Prohesion™ exposure in dilute Harrison solution, ($NH_4SO_4$) acid rain conditions, resulted in Mg-rich coatings with conventional binders maintaining clean scribes up to ~1,000 hours, in contrast with those coatings formulated with hybrid binders that realized clean scribes up to 3,000 hours and showed signs of failure at 5,000 hours. The integrity of the primer vehicle appears to be the main issue associated with improved corrosion control in these systems. All samples of Mg-rich primer coatings gave better performance in this exposure that the standard chromate based system with similar topcoat, and, as seen in FIGS. 5A-5E, the best performing of these Mg-rich systems after 4,800 hours visibly performed better than a non-pigmented primer/ELT™ system (FIG. 5E) after 1,800 hours exposure.

Example 5

Extended Electrochemical Study

A. Electrochemical Studies of Mg-Rich Coatings

EIS studies of the Mg-rich primer at 50% PVC (above CPVC) with topcoat, under conditions of high, neutral, and low pH were performed. An EIS test method was used that involved subjecting circularly scribed Mg-rich coatings to immersion varying the pH conditions in 3% NaCl solutions. This method was utilized to help differentiate among the various primer formulations developed in this work. Subjecting the system to acid (pH=2.8), neutral, and basic (pH=2.0) 3% NaCl immersion under scribed conditions allowed comparison of the formulations in a wide range of exposure conditions. The Mg-rich Al 2024 T-3 panels were topcoated with Deft 99 GY-001 ELT™, a very chemically resistant coating, scribed, and then subjected to continuous immersion. Three coating systems were evaluated as Mg-rich coatings, two commercially available off-the-shelf products and one hybrid silane modified epoxy-urea described hereinabove. Briefly, the three coating systems were:

1. Moisture cure (MC-PUR) aromatic polyisocyanate, Desmodur™ E23A, polyurea.
2. Epoxy/polyamine consisting of Epon™ 828 with a Mannich base polyalkylamine curative Epicure™ 3251.
3. Hybrid silane modified epoxy-urea consisting of Epon 1001 and Desmodur™ N3300 aliphatic polyisocyanate, Silquest™ A-1120 silane (N-β-(aminoethyl)-γ-aminopropyl trimethoxysilane) (see Table 2, formulation C).

B. Experimental Setup

Cylindrical electrode cells were mounted over samples with 1.0 cm diameter circular scribes cut though the coating exposing Al 2024 T-3 surface. Cylinders were filled with electrolytes of the following compositions: (1) Basic at 3% weight NaCl adjusted to pH=12.0 with NaOH; (2) Acidic at 3% weight NaCl adjusted to pH=2.8 with HCl; (3) Neutral at 3.0% weight NaCl at pH=6.2. Impedance measurements were carried out over an 11-day time period pH adjusted at each test interval using the EIS testing methodology described in Example 3. Unscribed topcoated films were also examined electrochemically to try to determine what is happening in undamaged coatings due to immersion in neutral 3% NaCl solution.

C. Results

Figure 6A:
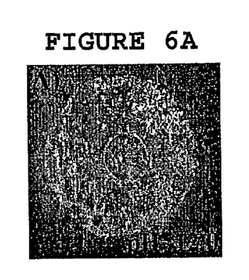
FIGS. 6A-6C are images of scribed Al 2024 T-3 samples after 11 days immersion and EIS testing at pH=12. The samples were coated with E23A (FIG. 6A), MC-PUR (FIG. 6B), or epoxy-Mannich base (FIG. 6C).
Figure 6B:
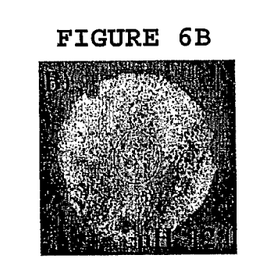
Figure 6C:
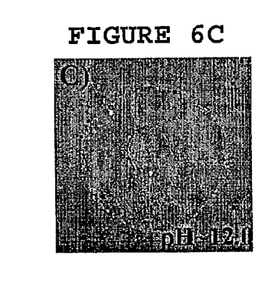
Figure 7A:
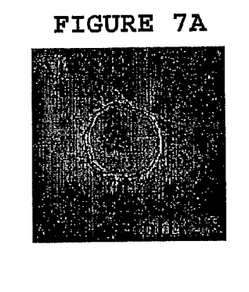
FIGS. 7A-7C are images of scribed Al 2024 T-3 samples after 11 days immersion and EIS testing at pH=2.8. The samples were coated with E23A (FIG. 7A), MC-PUR (FIG. 7B), or epoxy-Mannich base (FIG. 7C).
Figure 7B:
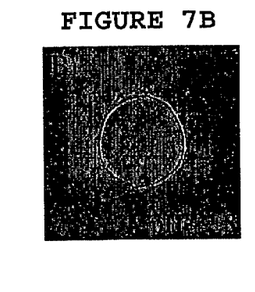
Figure 7C:
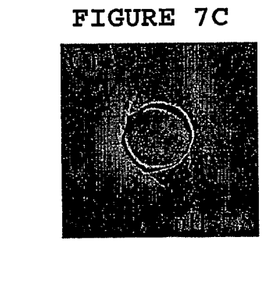

The visual results from the scribed exposure tests (FIGS. 6A-6C (basic conditions pH=12) and 7A-7C (acidic conditions pH=2.8)) indicated that, under conditions of high and low pH, the Mg-rich coating formulated with traditional coating polymers, i.e., MC-PUR and the epoxy/Schiff base have weakness at these pH extremes. At high pH=12, samples A (E23, MC-PUR) and C (hybrid epoxy-Mannich base) blistered after immersion exposure. At low pH=2.8, immersion exposure caused the film to disbond and lift from the substrate. The amino-silane modified hybrid polymer matrix (sample B) provides a much more pH resistant system in an Mg-rich coating in adhesion and reactivity than the more traditional polymers. No visible difference in scribed samples after 11-days testing suggests conditions at neutral pH=6.2 yield higher stability at the primer coating/interface.

Example 6

Discussion of Results

A. Dynamic and Mechanical Property Results

Viscoelastic DMTA measurements of polymer films revealed that hybrid silane modified epoxy-urea/urethanes displayed lower $T_g$s at equal crosslink densities to those of the parent materials suggesting the formation of bulk (—N—R—Si—O—Si—R—N—) bonds throughout the IPN matrix. In addition, the tensile properties of the silane modified epoxy-urea hybrids were better than their parent materials.

B. Flammability Results

There was no observed difference in flammability with respect to PVC for any of the four systems tested. The two conventional coatings, polyurea (MC-PUR) and (epoxy/polyamide) disbanded, liquefied, and incinerated with subsequent rapid magnesium incineration. The Hybrid-E23A, MDI, did not liquefy nor disbond, but formed a limited amount of char, without incineration of the magnesium metal. The Hybrid N3300, aliphatic, containing N-alkylisocyanaurate did not char nor did the Mg incinerate. It may be surmised that this Mg-rich coating was more covalently bonded to the Al substrate through the (—Al—O—Si—) linkages and that this additional covalent bonding may have exerted a positive influence on decreasing the coating's flammability.

C. Prohesion™ Exposure Results

Results of ASTM D5894-96 performed on the four coating systems with varying pigmentary Mg content from 43, 46, and 50% PVC, showed no clear trend in PVC as a function of exposure in dilute Harrison's solution. However, the 50% PVC samples in the hybrid formulations did perform slightly better. The silane modified epoxy-MDI hybrid system performed best reaching about 5,000 hours before failure, while the aliphatic silane modified epoxy-HMDI hybrid coatings failed over a range of 3,000-3,400 hours. The two other conventional Mg-rich coating systems: polyurea (MC-PUR) and epoxy/polyamide, failed over a time period between 2,000 to 2,600 hours with no clear difference between the two conventional off-the-shelf coating systems.

Example 7

Magnesium-Rich Primer Scale Up

The Mg-rich primer formulation was scaled up from laboratory quantity to 2.2 liters. The chosen PVC for this formulation batch was 50, a value considered to be slightly higher than the PVC of the system. The steps followed for the scale up were: (1) starting material preparation, (2) Mg powder preparation, (3) panel surface preparation, (4) tie coat preparation/application, and (5) Mg powder mixture preparation/application.

Starting material preparation was carried out using the following procedure.

The starting material, blue powder, was obtained by oxidation of 2-phenylhydroquinone in dichloromethane and trichloroisocyanuric acid using an apparatus which consisted of a 500 ml round bottom flask, Vigeraux condensation columns, a heating mantle, a stirring bar, temperature controls, and nitrogen influx. The following materials were used: 300 ml of dichloromethane ("DCM"), 5.0 grams 2-phenylhydroquinone ("2-PHQ"), and 2.3 grams of trichloroisocyanuric acid ("TCCA").

The reaction apparatus was assembled, and the 300 ml of DCM was added. The system was warmed to 36° C. When this temperature was reached and stabilized, 2-PHQ was added, and the system was purged with nitrogen gas. While controlling the temperature of the system at 35-36° C., the TCCA was added in small increments (about 0.2 grams per addition). Particular attention was paid to the TCCA addition: since this reaction is exothermic and involves the release of HCl gas as one of the products, if the TCCA is added too fast, the entire mixture will foam and rise up through the condensation columns.

Once all of the TCCA was added, the reaction was allowed to proceed for 30 minutes at 36° C. Then, the stirring was discontinued, and let the mixture was allowed to settle for 30 min.

To separate the final product from the non-oxidized part (still solid), a filtration device was assembled using two filter paper sheets and a funnel. The non-oxidized material was collected on the filter paper; and the remaining liquid, consisting of solvent and oxidized 2-PHQ, was collected in a container. The liquid, blue in color, was concentrated in a rotovap to allow complete separation of the final oxidized product and the remaining DCM solvent.

Mg powder preparation was carried out using the following procedure.

The Mg powders (Ecka granules™) used for the formulation were originally of two different particle sizes (Pk 31 and Pk 51). A mixture 50ml/50ml vol/vol ratio was used for this preparation. To obtain the correct amount of Mg powder, a graduated cylinder was used in conjunction with an ultrasound bath to force the powder to settle. The powder was poured in the graduated cylinder and sonicated for few minutes to allow settling until the quote of 50 ml was reached with the powder well settled. The Mg powders were separately measured and manually mixed. The mass of the final mixture was 33.5 grams.

Al 2024-T3 panels surface preparation was carried out using the following procedure.

Al 2024-T3 (Q-panel™) panels were used as the primer substrate. The panels were wire brushed in cross-hatch manner to remove grease and give grain appearance. They were then rinsed with 3-ethoxypropylacetate ("EEP") and allowed to dry. When dried, the panels were immersed in phosphoric acid for 60 seconds and rinsed with deionized ("DI") water. When dried, the panels were subjected to a 15-second soak in 2% KOH solution, and the panels were then again rinsed with DI water.

Silane surface pretreatment was carried out using the following procedure.

The Al 2024-T3 surface was sequentially treated with an amino-silane treatment to improve adhesion. The amino-silane treatment composition consisted of a mixture of aminosilane (Silquest A-1120) (2%), acetone (18%), and water (80%). The compounds were mixed in a beaker and applied to the panel surface using a foam brush. Then, the coated panels were allowed to dry at room temperature for 30 minutes.

Tie coat preparation/application carried out using the following procedure.

The tie coat was the first layer applied after the amino-silane surface pretreatment and before application of the Mg rich mixture. The tie coat consisted of a mixture of Xylene solvent and isocyanate (Desmodur™ A 23-E) in 95/5 wt. ratio. A mixture of 95 grams of Xylenes and 5 grams of Desmodur® A23-E was prepared and applied on the panels' surface using a foam brush.

Mg powder mixture preparation/application was carried out using the following procedure.

The previously mixed powders were mixed with epoxy base resin (1001-X-75), silane (Silquestυ A-1120), and isocyanate (Desmodur™ 3300) in the quantities reported in Table 5.

TABLE 5

Mg-Rich Primer, 2.2 Liter Batch

| Material | Amount (g) |
| --- | --- |
| EPON ™ 1001-CX-75 | 460.23 |
| Desmodur ™ 3300 | 207.93 |
| EEP Solvent | 217.50 |
| Propylene Carbonate | 1406.50 |
| Phenyl-p-Quinone | 21.75 |
| Aerosil ™ R-202 | 45.00 |
| Mg Powder (PK51/PK31) | 939.60 |
| Silquest ™ A-1120 | 65.25 |

Mixing was carried out continuously during the addition of the silane and isocyanate compounds, and a power mixer was used to allow good dispersion after the mixture was completed. The desired viscosity was reached through the addition of a thixotrope compound, for example, Degussa™ Aerosil R202, which was used in this experiment. At the desired viscosity, the mixture was sprayed on the panels' surface using a compressed air spray gun, and the coated mixture was allowed to dry for 2 days at room temperature before topcoat application.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method of treating an aluminum or an aluminum alloy metal to improve the metal's corrosion resistance, said method comprising: applying, to the surface of the metal, a coating which consists essentially of magnesium powder and a binder,
wherein the binder is a polymeric binder comprising a polyisocyanate prepolymer and an epoxy prepolymer and wherein said method further comprises contacting the polymeric binder with a crosslinker.

2. A method according to claim 1, wherein the coating is substantially free of chromium.

3. A method according to claim 1, wherein the coating does not comprise added chromium.

4. A method according to claim 1, wherein the metal is an aluminum alloy.

5. A method according to claim 4, wherein the aluminum alloy is a copper-containing aluminum alloy.

6. A method according to claim 5, wherein the copper-containing aluminum alloy is Al 2024 T-3.

7. A method according to claim 5, wherein the copper-containing aluminum alloy is Al 7075 T-6.

8. A method according to claim 1, wherein the magnesium powder comprises a mixture of a first magnesium particle powder and a second magnesium particle powder, wherein the first magnesium particle powder and a second magnesium particle powder have substantially different mean particle size distributions, wherein the mixture's bulk density is greater than the first magnesium particle powder's bulk density, and wherein the mixture's bulk density is greater than the second magnesium particle powder's bulk density.

9. A method according to claim 8, wherein the first magnesium particle powder has a mean particle size distribution of from about 25 μm to about 35 μm and wherein the second magnesium particle powder has a mean particle size distribution of from about 65 μm to about 75 μm.

10. A method according to claim 9, wherein the first magnesium particle powder has a mean particle size distribution of about 30 μm and wherein the second magnesium particle powder has a mean particle size distribution of about 70 μm.

11. A method according to claim 9, wherein the mixture contains first magnesium particle powder and second magnesium particle powder in a volume ratio of from about 40:60 to about 60:40.

12. A method according to claim 9, wherein the mixture contains first magnesium particle powder and second magnesium particle powder in a volume ratio of from about 45:55 to about 55:45.

13. A method according to claim 9, wherein the mixture contains first magnesium particle powder and second magnesium particle powder in a volume ratio of from about 50:50 to about 55:45.

14. A method according to claim 13, wherein the first magnesium particle powder has a mean particle size distribution of about 30 μm and wherein the second magnesium particle powder has a mean particle size distribution of about 70 μm.

15. A method according to claim 14, wherein the mixture contains first magnesium particle powder and second magnesium particle powder in a volume ratio of about 58:42.

16. A method according to claim 1, wherein the polyisocyanate prepolymer is an aliphatic polyisocyanate prepolymer.

17. A method according to claim 1, wherein the polyisocyanate prepolymer is an aromatic polyisocyanate prepolymer.

18. A method according to claim 1, wherein the crosslinker is a silanated tetrahydroquinoxalinol.

19. A method according to claim 1, wherein the crosslinker is a 7-phenyl-1-[4-(trialkylsilyl)-alkyl]-1,2,3,4-tetrahydroquinoxalin-6-ol.

20. A method according to claim 1, wherein the crosslinker is a 7-phenyl-1-[4-(trialkylsilyl)-butyl]-1,2,3,4-tetrahydroquinoxalin-6-ol.

21. A method according to claim 1, wherein, prior to said applying, said method further comprises: contacting the metal surface with an amine-containing organo-silane.

22. A method according to claim 21, wherein the amine-containing organo-silane is (N-β-(aminoethyl)-γ-aminopropyltrimethoxysilane.

23. A method according to claim 21, wherein said contacting the metal surface with an amine-containing organo-silane produces an amine-containing organo-silane treated metal surface and wherein, prior to said applying, said method further comprises: contacting the amine-containing organo-silane treated metal surface with a polyisocyanate prepolymer.

24. A method according to claim 1, wherein the polymeric binder is a silane modified epoxy isocyanate hybrid.

25. A method according to claim 1, wherein the polymeric binder is a polymeric material containing polyurea, polyurethane, epoxy-amine, and organo-silane linkages.

26. A method according to claim 1, wherein the magnesium powder is a powder of a magnesium alloy comprising (i) magnesium and (ii) calcium, manganese, lithium, carbon, zinc, potassium, aluminum, a rare earth metal or mixtures thereof.

27. A method according to claim 1, wherein the magnesium powder is a powder of a magnesium alloy comprising (i) magnesium and (ii) manganese.

28. A method according to claim 1, wherein said method further comprises pretreating the surface of the metal with cerium ion.

29. A method according to claim 1, wherein the metal is in the form of a sheet in physical contact with a metal fastener wherein the sheet and fastener are made of different metals and wherein the coating is applied to the surface of both the sheet and the fastener.

30. A method according to claim 1, wherein the magnesium powder is magnesium flake.

* * * * *